Feb. 29, 1944.  H. M. JOHNSTON  2,342,942
MANURE SPREADER
Original Filed June 25, 1938   3 Sheets-Sheet 1

INVENTOR.
HOWARD M. JOHNSTON
BY
ATTORNEY

Feb. 29, 1944. H. M. JOHNSTON 2,342,942
MANURE SPREADER
Original Filed June 25, 1938   3 Sheets-Sheet 2

INVENTOR.
HOWARD M. JOHNSTON
BY
ATTORNEY

Feb. 29, 1944.    H. M. JOHNSTON    2,342,942
MANURE SPREADER
Original Filed June 25, 1938    3 Sheets-Sheet 3
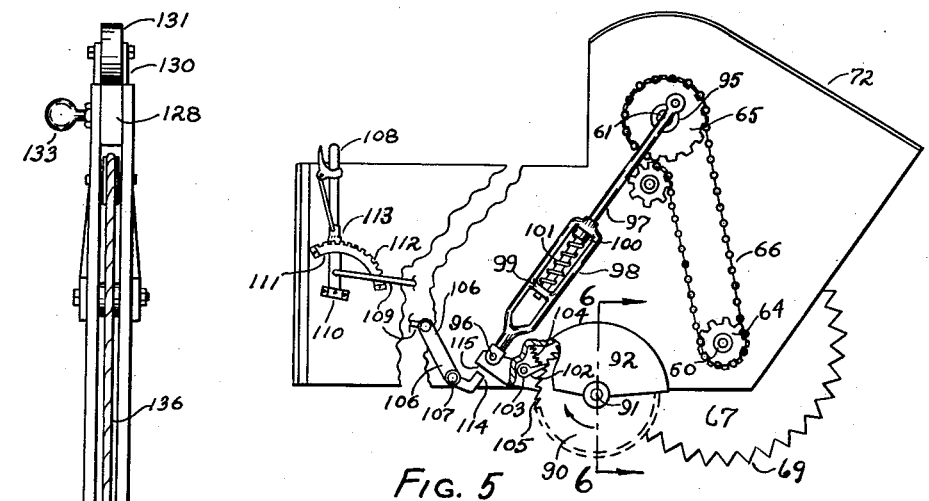
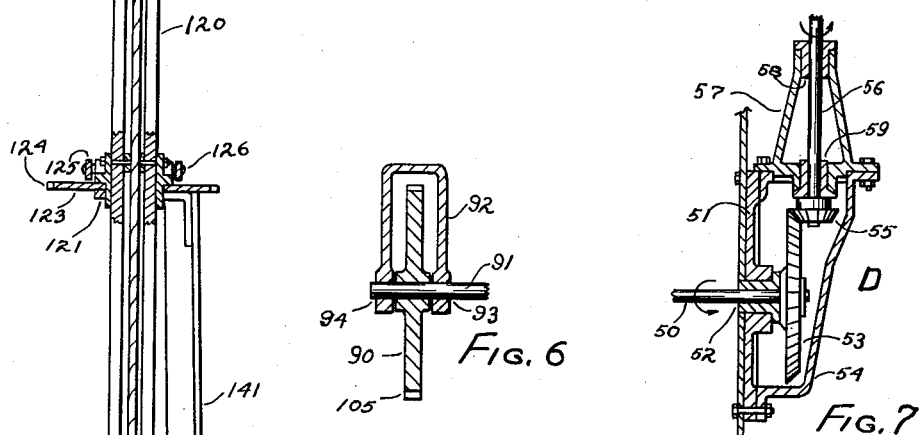
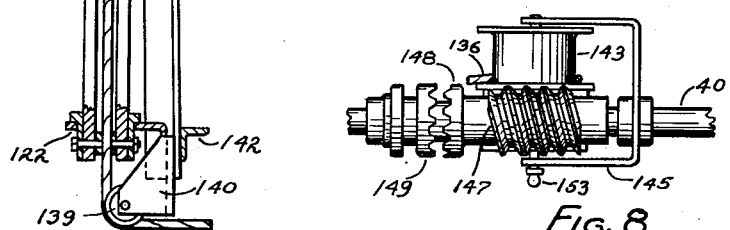
INVENTOR.
HOWARD M. JOHNSTON
BY
A.S.Kroh
ATTORNEY Patented Feb. 29, 1944

2,342,942

UNITED STATES PATENT OFFICE 2,342,942

MANURE SPREADER

Howard M. Johnston, Toronto, Ontario, Canada, assignor to Massey-Harris Company Ltd., Toronto, Ontario, Canada Original application June 25, 1938, Serial No. 215,595, now Patent No. 2,274,481, dated February 24, 1942. Divided and this application January 21, 1942, Serial No. 427,586

1 Claim. (Cl. 212—65)

It is the intention that the present patent shall cover by suitable expression in the appended claim, features of patentable novelty other than claimed in my Patent No. 2,274,481, dated February 24, 1942, of which this application is a division.

The present invention relates to a tractor drawn and operated spreader having two ground wheels which are positioned preferably somewhat in rear of the longitudinal center of the box, the front end having a rigid hitch which extends a distance forward of the box whereby the device will be made stable after being connected to the tractor and act as a two wheel trailer to the tractor.

The present invention further relates to means for driving the spreader cylinders and feed apron by a connection to the tractor power take-off.

My invention further relates to a novel manually controlled power operated loader being operable by any person capable of operating a tractor.

The object of the present invention, generally stated, is to further mechanize and tractorize farm work, perform the operation more efficiently, at greater speed and with a considerable less effort on the part of the operator.

To these and other useful ends, my invention consists of parts and combinations thereof or their equivalents, and mode of operation, as hereinafter described and claimed and shown in the accompanying drawings in which:

Fig. 5 is a fragmentary view of the left side of the spreader illustrating the apron operating device.

Fig. 6 is an enlarged sectional view of the ratchet mechanism taken on line 6—6 of Figure 5.

Fig. 7 is a transverse horizontally sectioned view of the gear box.

Fig. 8 is an enlarged top view illustrating the power take-off connection from the secondary shaft to the loading windlass.

Fig. 9 is an enlarged elevation of the loading standard.

Figure 1:
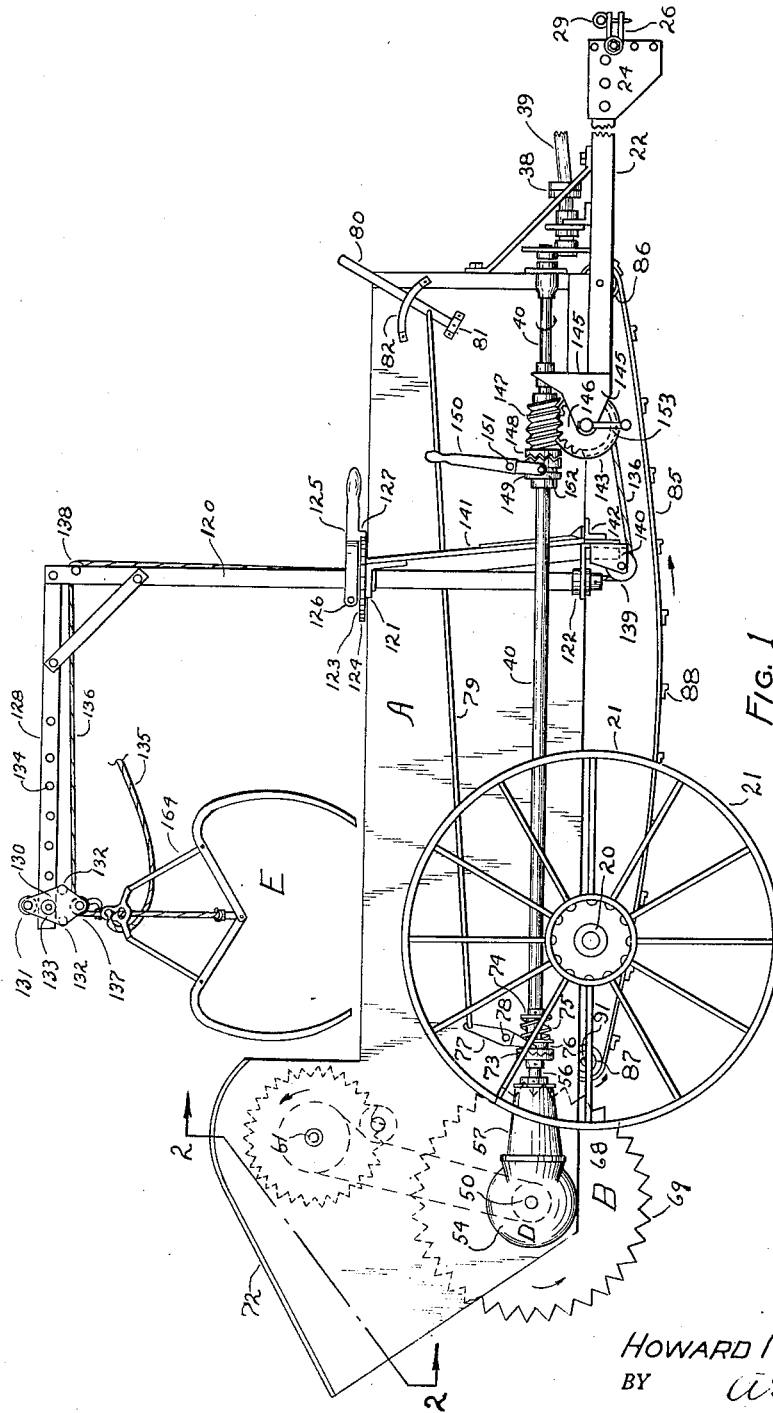
Fig. 1 is a side elevation of my improved spreader in its preferred design.

As thus illustrated, the box of the spreader is designated in its entirety by reference character A having a suitably positioned axle 20 upon which are mounted ground wheels 21.

I provide a rigid tractor hitch comprising hitch bars 22 which are, at their rear ends, suitably secured to the box and converging forwardly terminating as at 23 and being secured together at their forward ends by means of a formed and downwardly extending bracket 24. The front edge is provided with a number of vertically spaced apertures 25, whereby a clevis 26 may be secured to any one of the apertures by means of bolt 27 to thereby provide convenient and vertically adjustable attaching means to the tractor draw bar 28 through a linch pin 29. It will be seen that I have provided a two wheel trailer adapted to be pulled by a tractor and having means for vertical adjustment at its front end.

I provide preferably a transverse brace bar 35 which is mounted on hitch bars 22 in the position illustrated. A primary shaft 36 is rotatably mounted on bar 35 by means of a suitable bearing 37 (see Figure 3) and being provided on its front end with a universal joint 38 having a shaft 39, the front end (not shown) being preferably supplied with a splined member and a universal joint which is adapted to be attached to the power take-off shaft of the tractor; thus to provide sufficient flexibility for turning and moving over uneven ground.

Figures 3, 4:
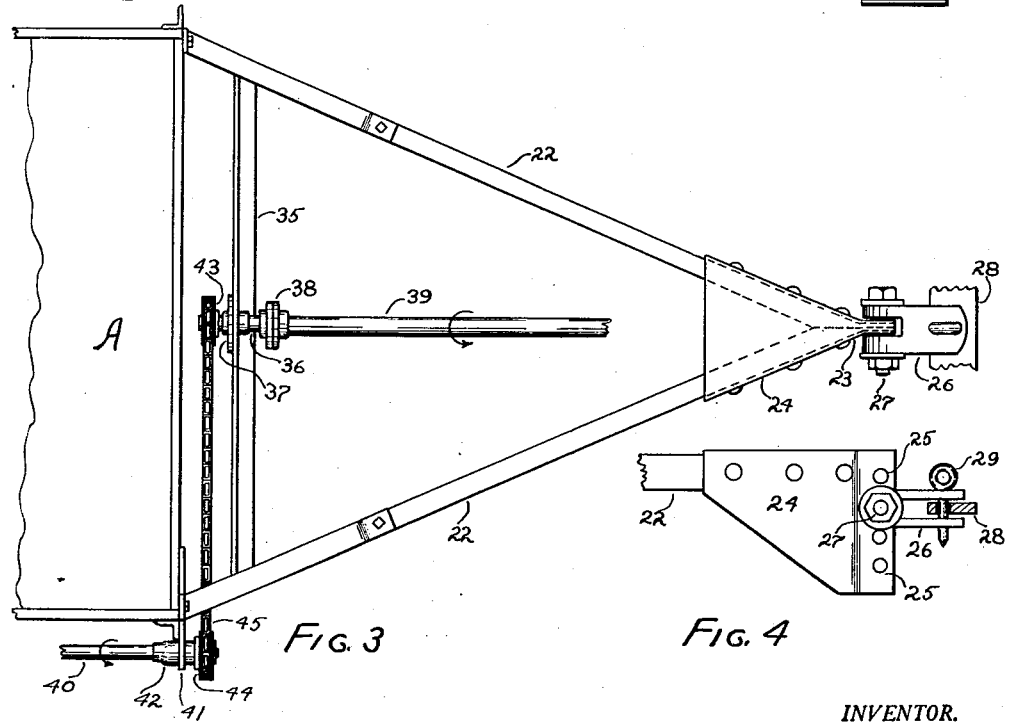
Fig. 3 is a top view of the hitch and a fraction of the box illustrating the preferred manner of transferring the power from the primary to the secondary shaft.
Fig. 4 is an enlarged side elevation of the adjustable hitch clevis.

I provide a secondary shaft 40 which is preferably rotatably mounted at its front end to the front end of box A by means of bracket 41 and bearing 42. I provide preferably a sprocket 43 which is preferably secured to the rear end of primary shaft 36 and I mount a suitable sprocket 44 on the front end of shaft 40 and being positioned in alignment with sprocket 43, the sprockets being operatively connected by means of a chain 45; thus shaft 40 will be driven by the power take-off of the tractor, the direction of rotation being as indicated in Figure 3 by curvilinear arrow.

I provide a spreader rotor, a beater rotor and a transmission, each being designated in its entirety by reference characters B, C and D respectively.

Rotor B is carried by shaft 50 one end of which is rotatably mounted on the inner member 51 of the transmission housing as at 52. I mount a bevel gear 53 on shaft 50 as clearly illustrated in Figure 7 and provide an outer gear box covering 54 which is suitably secured to member 51 as illustrated.

I provide a pinion 55 which is secured to the inner end of counter shaft 56, this shaft being rotatably mounted in a housing 57 as at 58 and 59. The other end of shaft 50 is rotatably mounted on the box as at 60. Rotor C is provided with a shaft 61 which is rotatably mounted on the box A as at 62 and 63. I mount a chain sprocket 64 on the protruding end of shaft 50 and another sprocket 65 is positioned in alignment with sprocket 64 and suitably secured to shaft 61.

Figure 2:
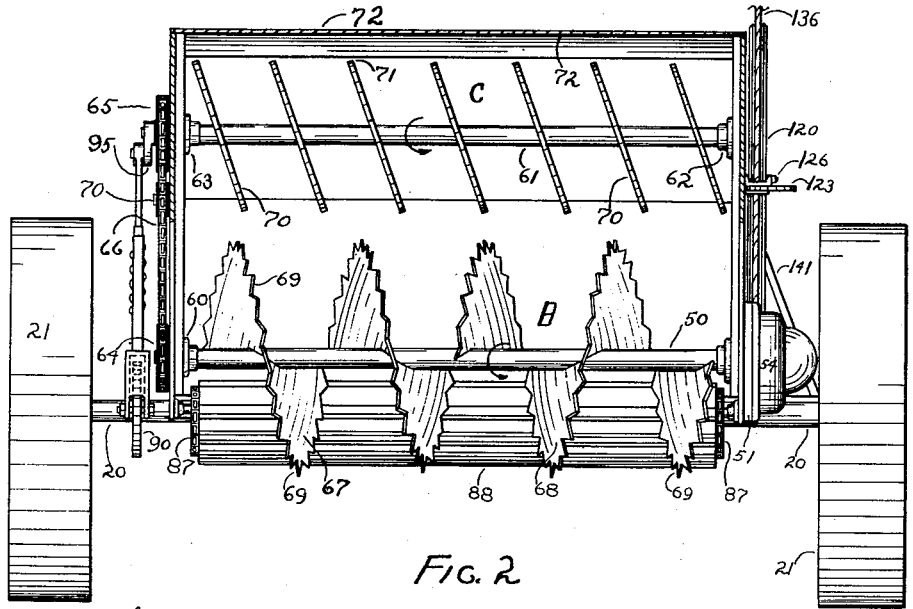
Fig. 2 is a rear elevation of the design shown in Figure 1, the hood being sectioned on line 2—2 of Figure 1.

Sprockets 64 and 65 are operatively connected by means of chain 66. Thus it will be seen that rotors B and C will turn in the same direction and as illustrated by curvilinear arrows in Figure 2.

I secure spiral members 67 and 68 to shaft 50. These spirals wind in opposite directions as illustrated, and are secured to shaft 50 by welding or otherwise.

I provide suitably shaped teeth 69 on the periphery of members 67 and 68, thus when member B is turned the teeth cooperating with the spirals will effectively move across the entire width of the box and act to tear apart the material being supplied to the rotor and spread it rearwardly and outwardly fan-like.

The top of box A is a considerable distance above the top of rotor B and therefore the rearwardly moving material in the box might be carried in bulk over the top of rotor B. I provide novel means for preventing this by mounting a number of evenly spaced discs 70 on shaft 61, these discs being placed at an angle on the shaft (see Figure 2) their peripheries being toothed similar to members 67 and 68 as at 71; thus as the material approaches rotor B, rotor C will act to prevent it from passing in bulk over rotor B and will assist in loosening the material and spread it forward in the box.

Clearly the sides of disc 70 will be caused to travel at opposite angles during every revolution of shaft 61; thus the staggered and alternate movement of teeth 71 will completely break up the surface of the material as it approaches the rotor and act very similar to the teeth on rotor B except in rotor B the action of the teeth and spirals will be to spread the material fan-like as it passes over the rotor whereas the discs 70 will act to move the surplus material forwardly. In order to prevent the material from getting out of bounds as it is broken up and spread by the rotors, I provide a hood 72, the action of which will be understood without further description.

By referring to Figure 1, it will be noted that I provide a clutch member 73 which is secured to the forward end of shaft 56 and a collar 74, a spring 75 and another clutch member 76 having an operating connection to a lever 77, the lever being pivotally mounted as at 78.

I provide a rod 79 which extends forwardly and is operatively connected to lever 80, this lever being pivoted to the box as at 81 and having a sector 82, the sector being provided with a notch (not shown) whereby the lever may be moved and locked in its rear position to thereby disengage the clutch and when freed it will permit spring 75 to yieldingly engage the clutch members, the teeth in the clutch member being beveled to thereby permit slipping as a precaution against injury to the moving parts. Lever 80 is positioned at the forward end of the box so as to be within convenient reach of the operator when seated on the tractor.

I provide a conventional apron 85 for moving the material in the box rearwardly in the following manner:

The apron at its forward end is carried by sprockets 86 and in the rear by driving sprockets 87. The apron is provided with cross bars 88 which pass over the top surface of the bottom of the box; thus when sprockets 87 are turned in the direction indicated by arrow, the upper half of the apron will travel rearwardly to thereby move the material toward the rotors.

In order to satisfactorily spread and deliver a suitable quantity of material over the surface of the ground it is necessary to provide means whereby the speed of the apron 85 may be conveniently varied by the operator. I provide an apron driving and carrying shaft 91 and mount a rachet wheel 90 on the protruding and of the shaft. I rotatably support a shield 92 on opposite sides of this rachet as at 93 and 94 (see Figure 6). Member 92 acts to shield the rachet from falling dirt and material.

I provide a crank 95 which is preferably secured to the protruding end of shaft 61 as illustrated, this crank having a pivotal connection to member 92 as at 96 through a pitman comprising a rod 97 and a link 98, the link having a bridge as at 99. The upper end of member 98 and member 99 have orifices for the free reception of rod 97.

I secure a collar 100 to member 97 and mount a spring 101 between this collar and bridge 99 thus member 92 will be oscillated by crank 95. A rachet dog 102 is pivotally mounted on member 92 as at 103 and a spring 104 is positioned so as to move the free end of the rachet into engagement with rachet teeth 105; thus when member 92 is oscillated on its support, ratchet wheel 90 will be caused to turn in the direction indicated by curvilinear arrow.

Crank 95 will have a length whereby member 92 will be oscillated over a range of four or more rachet teeth. This will cause the apron to travel at maximum speed. To reduce the speed of the apron, I provide means whereby rachet member 102 may be optionally caused to pass over any desired number of teeth per each revolution of the crank.

I pivotally mount a bell crank 106 on member A as at 107, the upper end of this bell crank being operatively connected to the controlling lever 108 by means of a rod 109. Lever 108 is pivoted as at 110 and is provided with a sector 111 having a number of notches 112 and a latch 113, whereby the lever may be moved to and held in various positions, the design being such that when the lever is held in its rear position, point 114 of the bell crank will permit full oscillation of member 92.

Member 114 of the bell crank is adapted to contact surface 115 when lever 108 is moved forward; thus this member 114 may be caused to contact surface 115 at various positions in its downward movement, the time of contacting depending upon the position of lever 108. Spring 101 acts to permit transmitting more or less of the crank movement to member 92. It will be seen that the speed of sprockets 87 will vary according to the position of lever 108.

It will be seen that I have provided a manure spreader adapted to be pulled by a tractor and supplied with power from the power take-off of the tractor, that I have provided means for evenly spreading the manure to any degree of thickness on the ground and convenient means for throwing the spreading mechanism in and out of gear.

One of the hard tasks on the farm is loading the spreader. The manure is frequently difficult to handle with a hand fork. I have provided means for making use of the tractor power for loading the manure into the box in the following manner:

I provide a two bar standard 120 which is pivotally mounted to box A as at 121 and 122. A sector 123 is preferably secured to member 121 and is provided with a number of spaced notches 124.

I provide a forked lever 125 which is preferably hingedly secured to member 120 as at 126 and having a projection 127 which is adapted to engage notches 124 when the lever is in its lowest position; thus by lifting member 125, standard 120 may be swung to any desired position.

I provide a horizontally extended arm 128 which is suitably secured to member 120 as illustrated. A carriage 130 is preferably supported on member 128 by means of a top roller 131 and stabilizing rollers 132.

I provide means for moving and locking the carriage in any desired position on arm 128 by means of a hand piece 133 and a pin (not shown) which is controlled by the hand piece and adapted to engage any one of a number of spaced orifices 134; thus carriage 130 may be positioned any place along the length of arm 128.

I provide a grapple fork, which in its entirety is designated by reference character E. This fork is similar to the conventional double acting multiple tined hay fork having a trip rope 135 and a lifting cable 136 which passes over a sheave pulley 137 (the sheave pulley being rotatably mounted on member 130) and then to another sheave pulley 138 from whence it extends downwardly and over sheave 139 and to drum 143.

Sheave 139 is rotatably mounted on bracket 140 which in turn is secured to box A by means of brace member 141 and a transverse L-iron 142.

I provide a bracket 145 which rotatably supports a worm gear 146 and drum 143 to which gear 146 may be secured. A worm pinion 147 is rotatably mounted on shaft 40, the teeth of which mesh the teeth in worm gear 146.

A clutch collar 148 is secured to worm pinion 147 and a clutch member 149 having teeth adapted to engage complementary teeth on member 148 is slidably splined on shaft 40. A lever 150 is pivotally mounted as at 151, the lower end being forked and adapted to operatively engage member 149 as at 152, thus when lever 150 is moved rearwardly, the teeth in member 149 will be caused to engage the teeth in member 148, thus to turn drum 143 and wind the cable on the drum. When lever 150 is moved forwardly, worm 147 will be disengaged from shaft 40.

When fork E contacts the material on the ground, it will be caused to embrace a suitable quantity and when the fork is lifted to the desired height by pulling rearwardly on lever 150, it will be locked to member 130 after which the fork may be swung to any desired position over the box by means of lever 125 and when necessary by moving member 130 on bar 128 and then released by pulling trip rope 135.

It will be understood that member 130 will be free to move on member 128 after the fork is locked in its upper position, after which time the cable 136 will be free to permit this movement. A manually operated crank or other means 153 is provided whereby drum 143 may be released from its connection to worm gear 146; thus to permit the automatic or manual unwinding of cable 136 for purposes which will be understood without further description.

It will be seen that the operator need only to manipulate levers 125 and 150 and trip rope 135 to pick up and release in the box a fork full of material.

Clutch members 148 and 149 are provided with beveled teeth which are held in mesh by pressure on lever 150, therefore under exceptional strains the clutch will slip and protect the loading mechanism.

Clearly many minor detail changes may be made without departing from the spirit and scope of the present invention as recited in the appended claim.

Having thus shown and described my invention, I claim:

A device of the character described, comprising in combination an elongated box having carrying wheels mounted on opposite sides thereof and a forwardly extending hitch secured to the forward end of the box adapted to be attached at its front end to the draw bar of a tractor, a shaft rotatably mounted on one side of said box and having an operating connection to the power take-off shaft of the tractor, a cable operated loading crane vertically rotatably mounted on said box intermediate the ends thereof and adjacent said shaft and having an operating connection thereto, said last operating connection comprising a drum having one end of said cable secured thereto and a manually operated clutch having over load slip characteristics between the shaft and drum whereby the operator may cause the loading device to engage material on the ground and lift it when said clutch is engaged, manually operated means on said crane whereby the material in different positions on the ground may be lifted and delivered in different positions in the box.

HOWARD M. JOHNSTON.